Jan. 13, 1948.  M. H. PRESS  2,434,518
MOTION PICTURE PROJECTOR
Filed June 23, 1944  4 Sheets-Sheet 1

INVENTOR.
Myron H. Press
BY Richards Geier
ATTORNEYS.

Jan. 13, 1948.    M. H. PRESS    2,434,518
MOTION PICTURE PROJECTOR
Filed June 23, 1944    4 Sheets-Sheet 3

INVENTOR.
Myron H. Press
BY
Richards y Geier
ATTORNEYS.

Jan. 13, 1948. M. H. PRESS 2,434,518
MOTION PICTURE PROJECTOR
Filed June 23, 1944 4 Sheets-Sheet 4

INVENTOR.
Myron H. Press
BY Richard Geier
ATTORNEYS.

Patented Jan. 13, 1948

2,434,518

UNITED STATES PATENT OFFICE 2,434,518

MOTION-PICTURE PROJECTOR

Myron H. Press, Woodside, N. Y.

Application June 23, 1944, Serial No. 541,789

3 Claims. (Cl. 88—16.8)

This invention relates to motion picture projectors and refers more particularly to a projector with non-intermittent motion of the film and having a shutter designed to produce motion pictures from the smoothly moving film.

An object of the present invention is to eliminate the dependence of motion picture projectors on intermittent motion of the film through the projection gate.

Another object is to minimize the deterioration of the perforations in the film due to their being engaged by sprockets in order to transport the film and being engaged by the reciprocating finger adjacent the projection window in order to transport the film intermittently.

Another object is to reduce the cost of the projector by eliminating the reciprocating mechanism which produces intermittent motion of the film.

Another object is to eliminate the clicking sounds produced by reciprocating mechanisms.

Another object is to eliminate the "loop" necessary with reciprocating mechanisms. The ordinary projector has power driven sprockets either side of the projection gate, the feed sprocket for the purpose of feeding film from the feed reel to the gate at the proper speed, the takeup sprocket for the purpose of feeding out film at the proper speed to the take-up reel after it has passed through the gate. The film extends in a generous loop between the gate and each sprocket, so that the film is perfectly free to move when actuated by the reciprocating finger which engages successive perforations and jerks the film through the gate one frame at a time. "Loss of loop" is the most common disaster of amateur film projection. If for any reason the feed sprocket ceases to feed properly, the film constituting the upper loop is transported through the gate but is not replaced, so that the loop disappears and the film is not free to respond to the jerk of the reciprocating finger, so that what appears on the screen is not a proper motion picture, and the perforations are frequencly destroyed.

Other objects will become apparent from the following specification.

In accomplishing the objects of the present invention it was found desirable to provide a steady continuous friction drive of the film by means of rollers below the gate, whereby the film is pulled through the gate and discharged to the takeup reel. The shutter is a cylinder having two oppositely disposed longitudinal slots, and located between the projection condensing lense and the projection window, and revolvable on its axis. The projection light is thus obstructed except when the two slots are lined up in the path of the light, or twice per revolution. The shutter is mounted on a shaft geared to a shaft bearing a sprocket which engages the perforations in the film and which is driven by the perforations. The sprocket is not connected to the motor.

In operation the shutter passes a beam of light for about three thousandths of a second just as each frame is perfectly centered in the projection window, effectively "stopping" the motion of the film moving through the gate, so that a series of clear still pictures is successively projected on the screen though the film is moving continuously.

The projector need not be adapted for sound projection but is capable of such adoption, as illustrated. The sound track scanning mechanism comprises two rollers, also located ahead of the friction drive. Their purpose is to present the film in a flat condition to a condenser lens placed between them and transmitting the light from an exciter bulb in the rear of the front panel. The sound track modifies the light from the exciter bulb and passes it to the photoelectric cell immediately in front of it, and the impulses registered by the cell are carried by wires to the sound reproducing system.

The invention will appear more clearly from the following detail description when taken in connection with the accompanying drawings showing, by way of example, preferred embodiments of the inventive idea.

In the drawings:

Figure 6 is a perspective view of the barrel type shutter.

Figure 7 is a side elevation of an alternative construction of the friction drive.

Figure 8 is a detail drawing of the friction drive shown in Figures 1 and 2.

Figure 1:
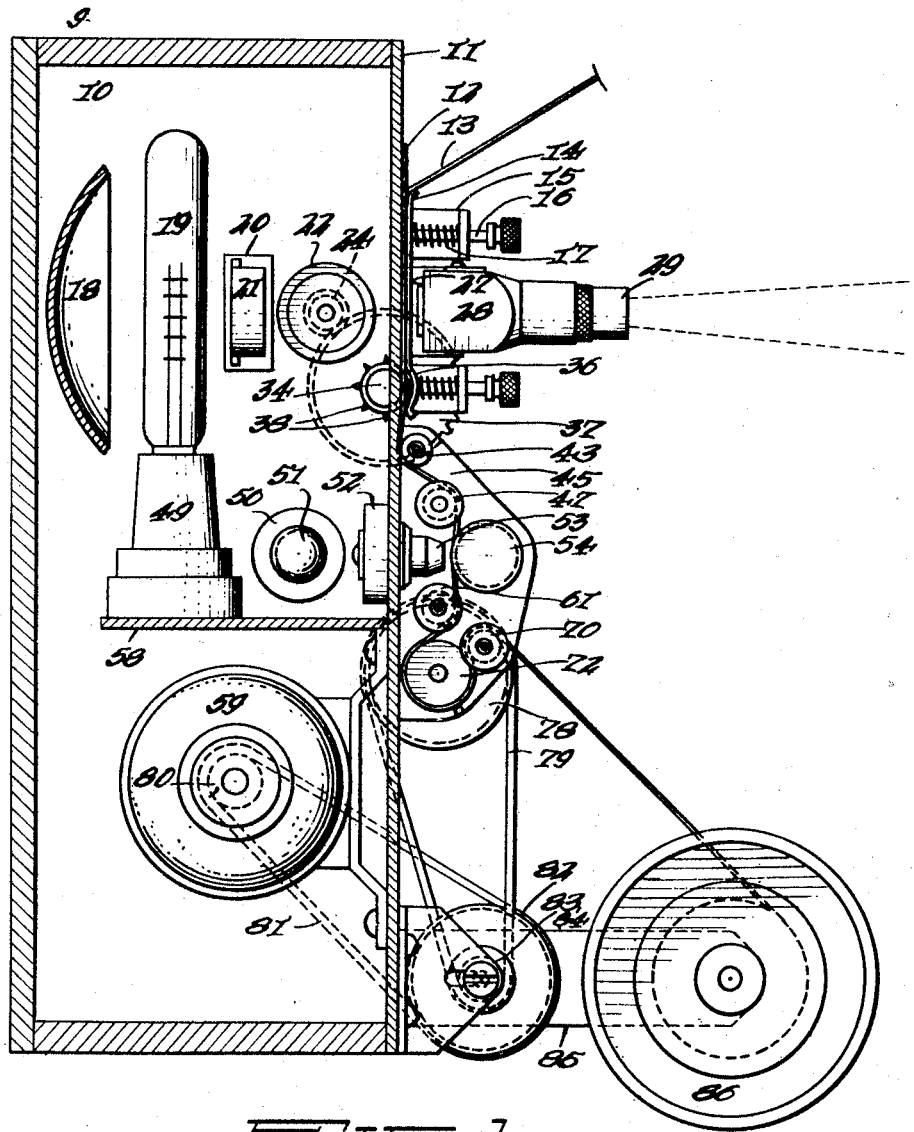
Figure 1 is a vertical section of the projector, with the feed reel omitted.

Figure 1 shows the projector case 9, comprising a front panel 11, interiorly of which is mounted the motor 59, which through pulley 80 and belt 81 drives pulley 82 which through integral sheaves 83, 84 on either side, drives pulley 78 of the friction drive through belt 79 and also drives takeup reel 86 through belt 85. Parabolic reflector 18 is located to the rear of projection bulb 19 for the purpose of utilizing the rearward rays of the bulb by reflecting them forward. Further description will be made from Figure 2 which is drawn to a larger scale.

Figure 2:
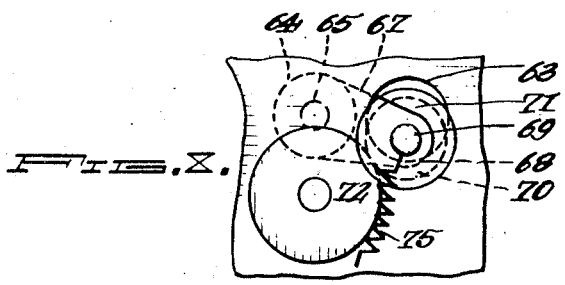
Figure 2 is an enlargement of part of Figure 1.
Figure 2:
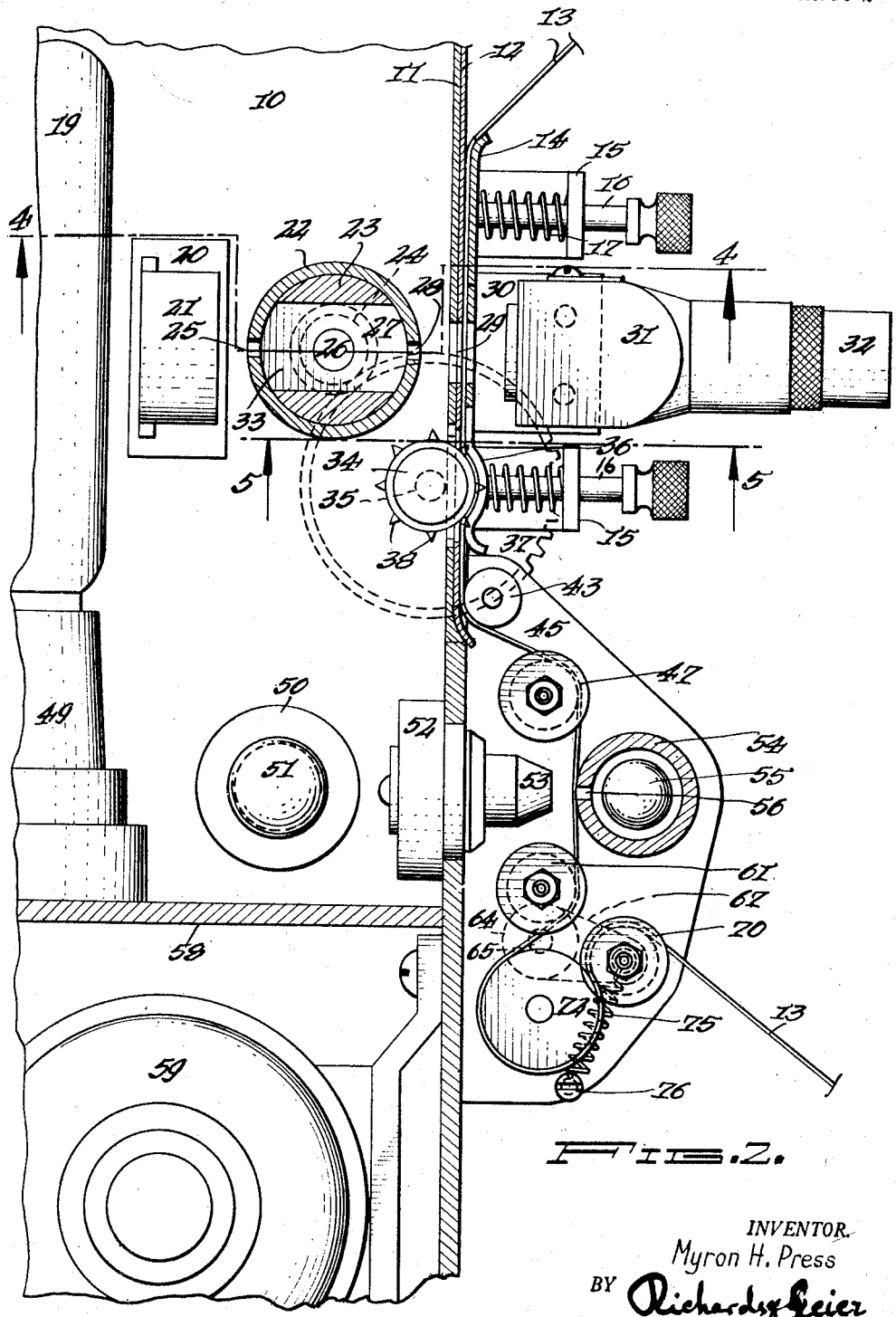
Figure 4:
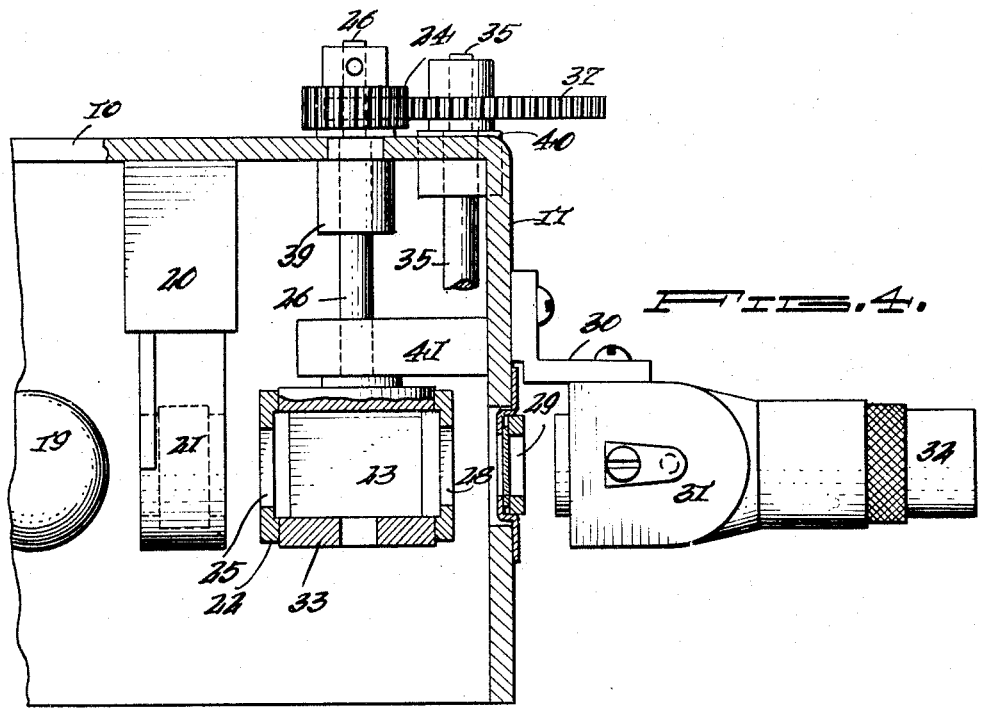
Figure 4 is a section along the broken line 4—4 of Figure 2.
Figure 5:
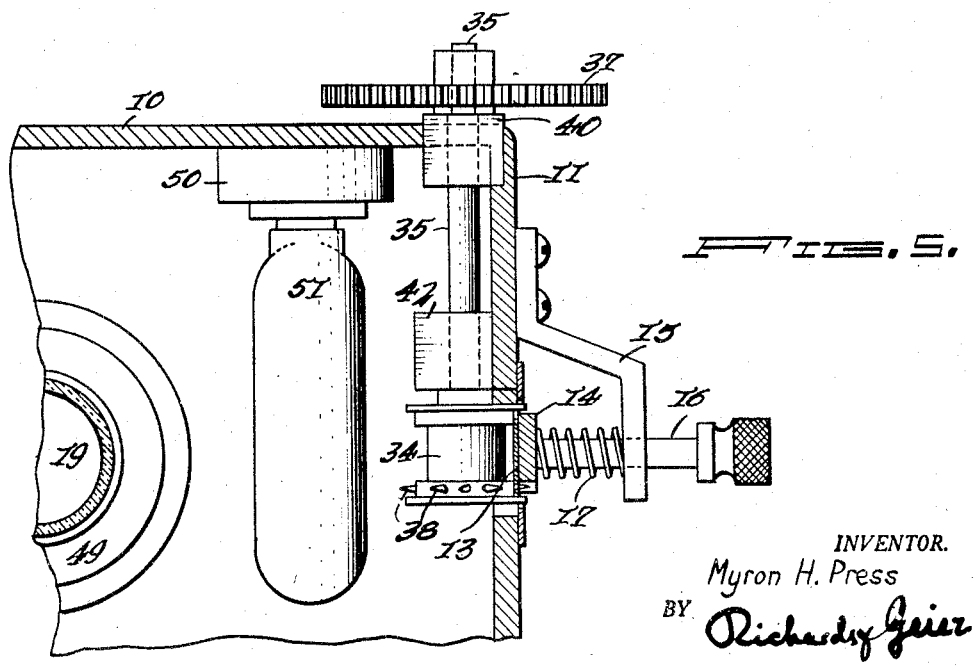
Figure 5 is a section along the line 5—5 of Figure 2.

In Figure 2, 10 represents the rear panel as viewed in this figure. Platform 58 extends perpendicularly to panels 10 and 11, imparting rigidity to the case and supporting the projector bulb 19 and base 49. In front of projector bulb 19 is condenser lens 21 mounted on block 20 which is fastened to wall 10. Between the condenser lens and the projection window 29 is the barrel type shutter 22, on opposite sides of which are longitudinal slots 25 and 28. The shutter is slidable on and off of a shutter support which is a cylinder which has been slotted to form the wide channel 27 therethrough, leaving only ends 33 and arcs 23 of the circular cross section. The shutter support is mounted on shaft 26 which is supported in blocks 39 and 41 (Figure 4) fastened to walls 10 and 11 respectively. Shaft 26 bears shutter gear 24 on its outer end. The shutter gear meshes with index gear 37 on shaft 35 which is supported in blocks 40 and 42 fastened on front panel 11 (Figure 5). On the inner end of shaft 35 is sprocket 34 whose teeth 38 engage the perforations in the film 13.

Bracket 30 supports the focusing lens mount 31 and projection lens 32 in front of the projection window.

Figure 3:
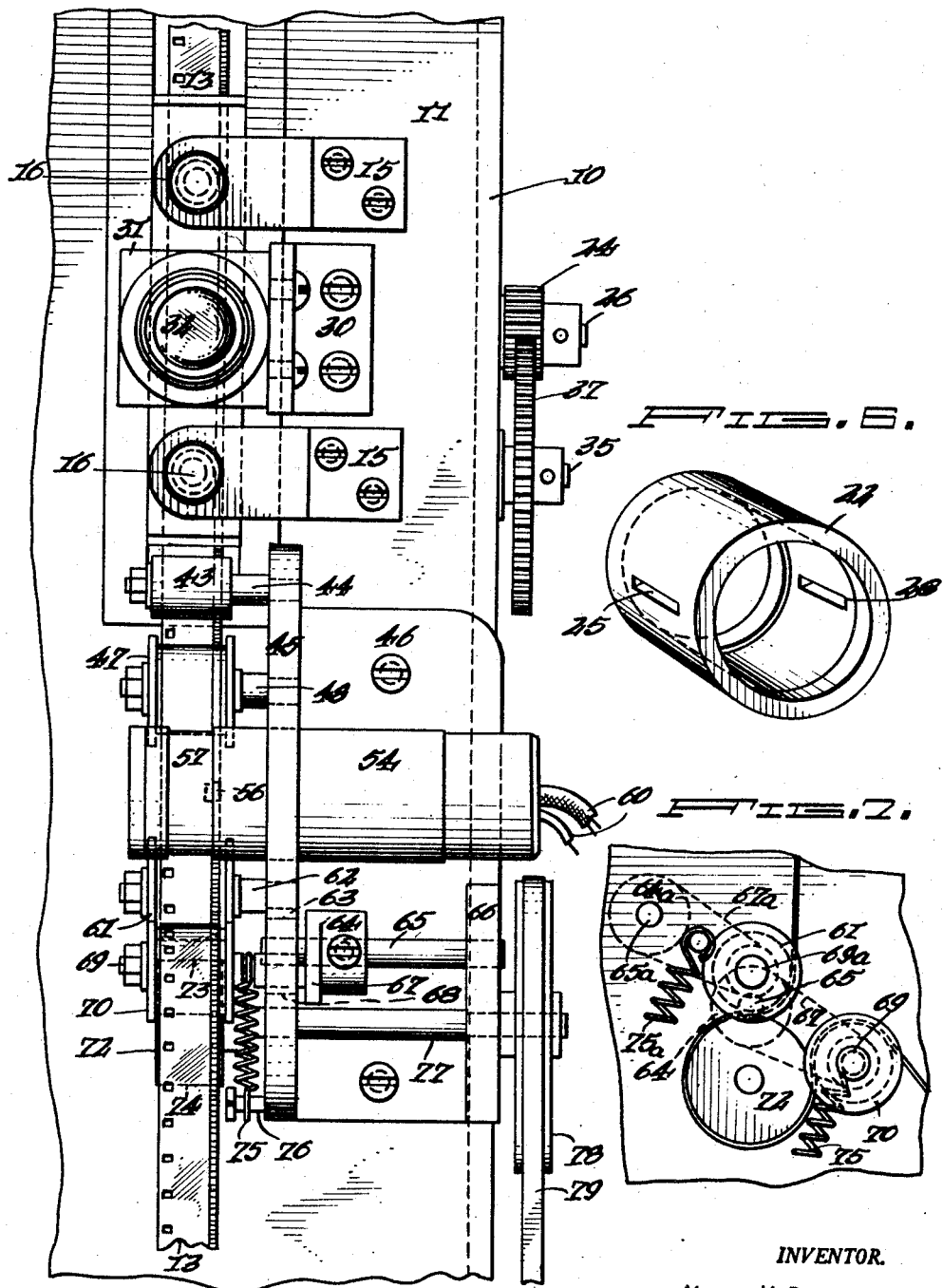
Figure 3 is a front view of the projector.

As has been described, the motor 59 drives pulley 78 (Fig. 3) which is mounted on shaft 77 which is journaled in standards 66 and 45 and on other other end of which is friction drive wheel 72, indicated by lines 73 and 74 in Fig. 3. The pivot 65, also journaled in standards 66 and 45, bears collar 64 which has an arm 67 on which is perpendicularly fastened shaft 69 which extends through hole 71 (Figure 8) which is indicated in Figure 3 by lines 63 and 68. Shaft 69 supports roller 70, which is kept in contact with drive wheel 72 by spring 75 attached to shaft 69 and to anchor pin 76 mounted on standard 45.

Rollers 47, 61 and 70 have end portions of a diameter somewhat larger than their main diameter on which the film rides, the ends thus forming a channel for the film. Rollers 47 and 61 are mounted on shafts 48 and 62 respectively, which are mounted in standard 45. The function of rollers 47 and 61 is to present the film flatly to the aperture 56 in the case 54 of the photoelectric cell 55 which scans the beam from the exciter bulb 51 mounted on base 50 mounted on panel 10. The beam passes through the condenser lens 53 mounted in panel 11 and block 52, is modified by the soundtrack and actuates the photoelectric cell, the impulses of which are carried by wires 60 to the sound reproducing system, not shown.

The gate consists of back plate 12 mounted on panel 11 and front plate 14 carried by pins 16 sliding in brackets 15 mounted on panel 11. Springs 17 keep plate 14 against film 13 and film 13 against plate 12. Opposite sprocket 34 plate 14 is curved to correspond to the sprocket, whereby the teeth 38 are afforded a better engagement with perforations of the film.

In operation drive wheel 72 revolves counterclockwise. Line contact with the film is provided by roller 70 and surface contact of the film with wheel 72 is maintained by reason of the fact that the film is under tension. The film is pulled off the feed reel, not shown, through the gate, under roller 43, over rollers 47 and 61, and onto drive wheel 72. Takeup reel 86 takes the film as it comes from roller 70.

It is understood that the perforations of the film 13 are on the division lines between the frames of the film. Shutter 22 is so related to sprocket 34 through gears 24 and 37 that it makes half a revolution every time a tooth 38 of the sprocket passes a given point. It is thus possible to have the slots 25 and 28 of the shutter in line with the beam of the projection bulb at the exact moment when a frame is registered in the window 29, and at all other times the slots are out of line with the projection beam which is thus interrupted. The slots are so narrow, that, in the 16 millimeter model illustrated, the beam is only projected for about three thousandths of a second, and the motion of the film during this period is so slight that a substantially clear still picture is projected. The human eye retains this image for about one twentieth of a second after it has disappeared, and since sound film is projected at the rate of twenty-four frames a second, the next frame has been projected before the eye has ceased to register the preceding one, and the illusion of continuous motion is created on the screen.

The sound track is scanned as it passes aperture 56 as heretofore described.

Figure 7 shows a modification of the friction drive consisting in that roller 61 has been pivoted similarly to roller 70, with the parts corresponding to the pivot construction of roller 70 marked with similar numerals followed by an *a*. This construction makes more positive the surface contact of the film with drive wheel 72.

It is apparent that the specific illustrations shown above have been given by way of illustration only and not by way of limitation, and the structures above described are subject to wide variation and modification without departing from the scope and intent of the invention, all of which variations and modifications are to be included within the scope of the present invention.

What is claimed is:

1. In a motion picture projector, in combination with a film transporting device comprising a drive wheel for frictionally engaging the film, a drive connected with said drive wheel for continuously driving the same, and a gate guiding said film and having a window formed therein, whereby the film is continuously pulled across said window; a sprocket engaging the film and rotated by the movement of the film, a rotary shutter having slots formed therein, said slots being movable in alinement with said window in the course of rotation of said shutter, and a drive operatively connecting said sprocket with said shutter to rotate said shutter in synchronism with said movement of the film.

2. A motion picture projector in accordance with claim 1; wherein said shutter comprises a cylinder having a wide transverse slot formed therein, a shaft firmly connected to one end of said cylinder, and a barrel type shutter member having two diametrically disposed slots and carried by said cylinder, said barrel type shutter member being removable off the other end of said cylinder.

3. In a motion picture projector, in combination, a drive wheel for frictionally engaging a motion picture film, a motor, a pulley driven by said motor, a takeup reel for winding the film, means operatively connecting said pulley with said drive wheel and said takeup reel, rollers engaging said film and guiding it toward said drive wheel, a back plate contacting said film on its way to said rollers, a front plate adjacent said back plate, resilient means pressing said front plate against the film upon said back plate, said back plate and said front plate having alined openings formed therein and constituting a window, whereby the film is continuously pulled across said window, said front plate having a curved portion, a sprocket fitting into said curved portion and in engagement with said film, whereby said sprocket is rotated by the movement of the film, a rotary shutter having slots formed therein, said slots being movable in alinement with said window in the course of rotation of said shutter, a shaft supporting said shutter and rotatable therewith, a shutter gear rotatable along with said shaft, an index gear meshing with said shutter gear, the ratio of said gears enabling a rotation of said shutter in synchronism with said movement of the film, and another shaft carrying said index gear and said sprocket and rotatable therewith.

MYRON H. PRESS.

REFERENCES CITED

The following references are of record in the file of this patent:

UNITED STATES PATENTS

| Number | Name | Date |
|---|---|---|
| 1,098,370 | Donnelly | June 2, 1914 |
| 2,095,831 | Phillips | Oct. 12, 1937 |
| 2,276,871 | Press | Mar. 17, 1942 |
| 1,946,934 | Dorst | Feb. 13, 1934 |
| 2,257,938 | Clothier | Oct. 7, 1941 |
| 2,120,249 | Holman | June 14, 1938 |
| 2,132,003 | Holst | Oct. 4, 1938 |
| 1,940,151 | Serrurier | Dec. 19, 1933 |
| 1,892,554 | Kellogg | Dec. 27, 1932 |
| 1,906,186 | Deville | Apr. 25, 1933 |
| 1,713,726 | Vogt et al. | May 21, 1929 |

FOREIGN PATENTS

| Number | Country | Date |
|---|---|---|
| 349,397 | Germany | Mar. 2, 1922 |